United States Patent
Devine (10) Patent No.: US 7,327,055 B2
(45) Date of Patent: Feb. 5, 2008

(54) PERMANENT MAGNET GENERATOR WITH AN INTEGRAL COOLING SYSTEM

(75) Inventor: John C. Devine, Seattle, WA (US)

(73) Assignee: John Devine, Seattle, WA (US)

( * ) Notice: Subject to any disclaimer, the term of this patent is extended or adjusted under 35 U.S.C. 154(b) by 0 days.

(21) Appl. No.: 10/629,882

(22) Filed: Jul. 28, 2003

(65) Prior Publication Data

US 2004/0084977 A1 May 6, 2004

Related U.S. Application Data

(60) Provisional application No. 60/399,086, filed on Jul. 26, 2002.

(51) Int. Cl.
*H02K 9/00* (2006.01)
(52) U.S. Cl. ...................... 310/58; 310/60 A
(58) Field of Classification Search .......... 310/52, 310/58, 61, 60 A, 156.08, 156.09
See application file for complete search history.

(56) References Cited

U.S. PATENT DOCUMENTS

| | | | | |
|---|---|---|---|---|
| 4,358,303 A * | 11/1982 | Rakow | ........................ | 55/408 |
| 4,574,210 A * | 3/1986 | Wieland | ........................ | 310/59 |
| 4,641,080 A | 2/1987 | Glennon et al. | ............... | 322/49 |
| 4,649,331 A | 3/1987 | Jahns | ........................ | 318/798 |
| 4,939,398 A | 7/1990 | Lloyds | ........................ | 310/156 |
| 4,954,736 A | 9/1990 | Kawamoto et al. | .......... | 316/156 |
| 4,973,871 A | 11/1990 | Bisantz | ........................ | 310/154 |
| 5,006,745 A | 4/1991 | Nishio et al. | ............... | 310/177 |
| 5,041,749 A | 8/1991 | Gaser et al. | ................ | 310/156 |
| 5,083,054 A | 1/1992 | Tomite et al. | ............... | 310/154 |
| 5,095,238 A | 3/1992 | Suzuki et al. | ................ | 310/156 |
| 5,223,757 A * | 6/1993 | Staub et al. | ................... | 310/54 |
| 5,365,133 A * | 11/1994 | Raad | ........................ | 310/68 D |
| 5,424,902 A | 6/1995 | Shida et al. | ................. | 361/148 |
| 5,508,576 A | 4/1996 | Nagate et al. | ............... | 310/156 |
| 5,605,045 A * | 2/1997 | Halimi et al. | ................. | 60/607 |
| 5,796,198 A | 8/1998 | Sugino et al. | ................ | 310/89 |
| 6,034,548 A | 3/2000 | Churcher et al. | ............ | 326/49 |
| 6,087,744 A * | 7/2000 | Glauning | ..................... | 310/58 |
| 6,254,458 B1 * | 7/2001 | Julien | ........................ | 451/41 |
| 6,369,478 B1 | 4/2002 | Koharagi et al. | ...... | 310/156.48 |
| 6,661,145 B1 * | 12/2003 | Nilson | ................... | 310/156.22 |
| 6,700,242 B2 * | 3/2004 | Kawamura | ............... | 310/68 R |
| 6,897,587 B1 * | 5/2005 | McMullen et al. | ........ | 310/90.5 |

* cited by examiner

*Primary Examiner*—Dang Le
*Assistant Examiner*—Nguyen Hanh
(74) *Attorney, Agent, or Firm*—David L. Garrison; Merchant & Gould (57) ABSTRACT

A cooling system for a sealed permanent magnet generator is disclosed that has a rotor shaft that is hollow. Permanent magnets mount on the exterior of the hollow rotor shaft. The rotor shaft has a pressed aluminum tube in various configuration on the inside bore with an end-mounted fan. The aluminum tube acts as a heat sink to draw the heat generated by the magnets through the rotor shaft and aluminum tube. The fan draws cooling air through the hollow bore of the rotor shaft thus cooling the magnets and forces the heated air through passages on the exterior of the stator housing. Because the airflow is not in contact with the electrical portions of the generator the cooling system will perform in dusty, wet and explosive environments. In another configuration a refrigeration compressor installed in the rotor shaft bore cools the rotor shaft and the fan cools the stator passages.

8 Claims, 6 Drawing Sheets

PERMANENT MAGNET GENERATOR WITH AN INTEGRAL COOLING SYSTEM

CROSS REFERENCE TO RELATED APPLICATION

This application claims benefit of Provisional Patent Application No. 60/399,086, filed Jul. 26, 2002, entitled "Permanent Magnet Generator Cooling System."

TECHNICAL FIELD

This application relates to the general field of permanent magnet generators and, more particularly, a cooling system therefore.

BACKGROUND OF THE INVENTION

Producing electricity with permanent magnet generators is well known. Such generators generally operate by rotating a shaft having permanent magnets affixed to its surface in a stator, that is generally comprised of copper windings, to produce an electromagnetic current. The permanent magnet generators in general use generally employ rotors comprise of rare earth magnet shafts rotating at speeds, on the order of 150 rpm to 20,000 rpm, within a generator stator. Due to the high strength of the magnets and high operating speed or the very large magnets required at low speeds, the generators are able to produce very high output power densities (defined as the ratio of power output to generator volume). Significant heating of both the generator stator and the rotor is associated with the power density, and this heat can damage the generator windings and demagnetize the rotor if it is not effectively removed from the generator.

The damage and demagnetization caused by excessive heat can result in electo-echanical failure, power loss, or erratic power fluctuation. In some applications such as generator providing electricity for welding generators excessive heat can result in very short and repetitive peak electrical loads One method of cooling generators is the use of fluids in a closed system within the generator. The disadvantage of fluid cooling generators is that it does not cool the generator rotor shaft, is fairly complex, requiring a circulating pump and a radiator, and it also has the potential to leak fluid and cause damage to the system.

Conventional generator systems are typically cooled by air or hydrogen, both in the form of a forced convective flow within channels and turning regions. An industry requirement for the stator bars within the generator core is that the central region temperature between conducting bars not exceed a preset limit. Many factors influence the maximum central region temperature experienced in operation, including the stator bar design and insulation, the magnetic flux field, the core design, and the cooling design. Air-cooled systems have also been used in permanent magnet generators with varying degrees of success in that most known air-cooled systems can not adequately cool the rotor.

It is known to connect cooling devices to the stator and in this way reduce the heating of the generator and its components. However, due to the spatial arrangement of the stator and the rotor, it is very difficult to provide cooling devices in certain regions of the generator, such as the rotor, that are not very accessible.

Therefore, a need exists for a method or device that can be used for effectively cooling all of the components of a permanent magnet generator, or for a generator that has such a device integral to the generator itself. Such generators, methods, or devices that do not interfere with the spatial arrangement of the stator and rotor, do not run the risk of leaking fluid in the generator, and can effectively cool the rotor would be a significant advantage over the prior art.

SUMMARY OF THE INVENTION

It is an object of this invention to provide a cooling system for a sealed permanent magnet generator having a hollow rotor shaft.

Another object of this invention to provide such a cooling system wherein the permanent magnet generator is air-cooled.

It is a further object of this invention to provide a self-cleaning air filter for a permanent magnet generator cooling system.

It is yet another object of this invention to provide a cooling system for a permanent magnet generator wherein the permanent magnet generator is cooled by a refrigeration compressor mounted internally in the rotor shaft bore.

Accordingly, the present invention discloses a hollow rotor shaft for a sealed permanent magnet generator wherein cooling air is drawn into the rotor shaft. Permanent magnets are mounted on the exterior of the hollow rotor shaft. The rotor shaft has a pressed aluminum tube in various configuration on the inside bore with an end-mounted fan. The aluminum tube acts as a heat sink to draw the heat generated by the magnets through the rotor shaft and aluminum tube. The fan draws cooling air through the hollow bore of the rotor shaft thus cooling the magnets and forces the heated air through passages on the exterior of the stator housing.

Because the airflow is not in contact with the electrical portions of the generator the cooling system will perform in dusty, wet and explosive environments.

In one preferred embodiment of the current invention, a permanent magnet generator cooling system is comprised of a stator housing having a stator that is press fit within the housing. A hollow permanent magnet rotor shaft, that is rotatably mounted within the stator, has an air inlet in the shaft and, a fan mounted on the shaft said magnets being placed such that the opposite poles of adjoining magnets face each other.

During operation, the fan mounted on the permanent magnet rotor shaft draws cooling air through the rotor shaft bore and the air absorbs heat from an aluminum liner on the interior of the rotor shaft. The aluminum liner can have radial fins, or it can be configured as a vane axial fan. The heated air is then ejected through the stator housing over the stator housing external fins, which extend generally axially from front to rear along the outer cylindrical surface of the stator housing, and into the atmosphere.

Another preferred embodiment of the invention provides a permanent magnet generator cooling system comprising a refrigeration compressor mounted internally in the rotor shaft bore of a hollow permanent magnet generator rotor shaft. The compressor rotor is connected to the generator end cover by a splined quill shaft.

The refrigeration compressor has refrigerant coils or other devices mounted inside the rotor shaft, and arranged to draw heat from the interior of the rotor shaft. This embodiment includes a condenser mounted on the rear of the rotor shaft. In operation, the refrigerant from the refrigerant coils absorbs the heat from the inside of the shaft and the heated refrigerant is drawn to the condenser and cooled by air that passes over the condenser coils as the rotor shaft rotates. The cooled refrigerant is then forced back into the refrigerant coils.

BRIEF DESCRIPTION OF THE DRAWINGS

Having described the invention in general terms, reference will now be made to the accompanying drawings in which.

BEST MODE OF CARRYING OUT THE INVENTION

Turning now to the drawings, the invention will be described in preferred embodiments by reference to the numerals of the drawing figures wherein like numbers indicate like parts.

Figure 1:
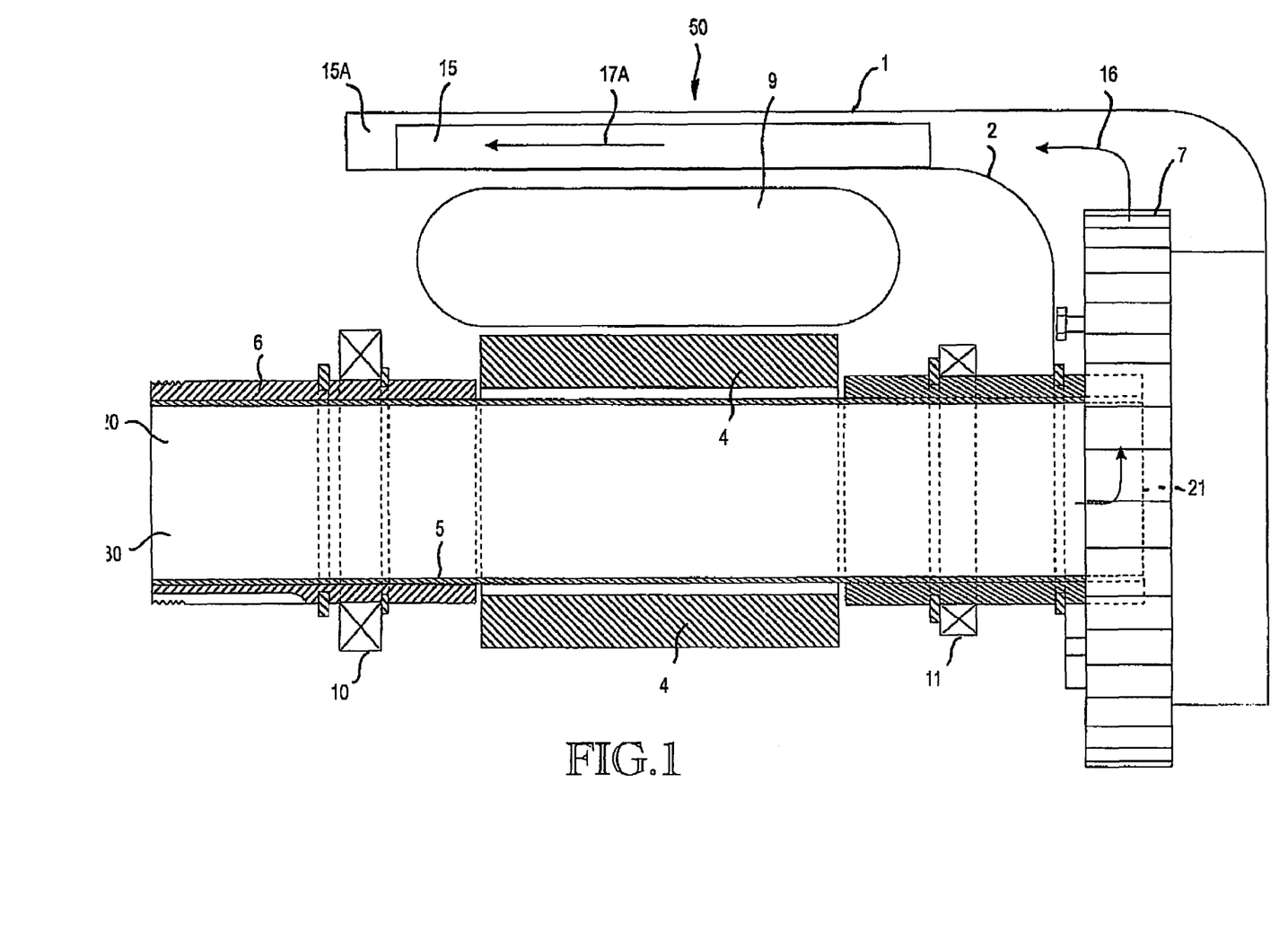
FIG. 1 is plan view, partially in section, of a permanent magnet generator that is cooled according to the disclosure herein.

In FIG. 1, there is shown one preferred embodiment of a permanent magnet generator having a cooling system 50 according to the present invention. The generator has a generator housing 1, and a stator housing 2 that is fit within the generator housing. Stator windings 9 are located in the stator housing 2 and a rotor shaft 6 having a permanent magnet 4 attached to the outer surface thereof is rotatably mounted within the stator winding. The stator cooling fins 15 form part of the stator housing 2. The cooling fins 15 extend into an annular space 16 between the permanent magnet generator housing 1 and the stator housing 2.

A hollow permanent magnet rotor shaft 6 is rotatably supported within the permanent magnet generator stator. The hollow shaft has an air inlet end 20 and an air outlet end 21. An aluminum tube or sleeve 5 is fitted to the inside of the shaft 6 to act as a heat sink. The interior of the sleeve 5 can be finned or it can be configured to function as an internal vane axial fan mounted inside said hollow shaft 6. In embodiments of the invention where the interior of the sleeve 5 is not configured to function as a fan 7, a fan can be mounted on one end of the shaft. Some preferred embodiments can include both a fan mounted on the end of the hollow rotor shaft and a sleeve configured to function as a fan.

It is preferred that one or more radial, or journal bearings rotatably support the rotor, and in the embodiment depicted the rotor 6 and the permanent magnets disposed therein are rotatably supported by bearings 10 and 11. All bearings in the permanent magnet generator 1 may be radial or journal bearings.

In operation, the rotor shaft 6 is powered by some external means that is connected to the shaft at the air intake end of the shaft 6. The means of power can include but are not limited to an engine, wind-powered means, or hydraulic powered means. As the rotor shaft 6 rotates in the stator, the permanent magnets 4 generate a magnetic field and induce an electrical current in the stator winding 9. As the generator operates, the aluminum tube 5 draws heat from the magnets and rotor shaft thereby acting as a heat sink. The fan draws cooling air 30 through the hollow bore of the rotor shaft 6 to cool the aluminum tube 5, thus cooling the magnets 4 and the shaft 6. The air is drawn through an air filter and into the primary inlet 20. The cooling air 30 is drawn into the rotor tube and the aluminum liner where it adsorbs the heat drawn from the magnets by the aluminum tube.

The cooling air 30 then exits the rotor shaft and is forced into stator cooling channel 16. Heat is exchanged from stator winding 9, into cooling fins 15, and then to the cooling air 30, which flows through the annular space 16 between the generator housing 1 and the stator housing 2. The air cools the stator cooling fins 15 and stator housing 2 and then exits to the atmosphere.

Through this process, the hollow rotor shaft 6 and permanent magnets 4 are cooled thereby increasing the magnetic field strength of the rotor and improving the generator's efficiency. The system is very simple and requires no additional systems to function.

As can be seen in the drawings, the stator housing 2 and the generator 1 housing form a closed system such that the cooling air can pass through the generator without coming into contact with the electrical components of the generator. This allows the generator to be used in damp, dusty, or explosive environments.

Figure 2:
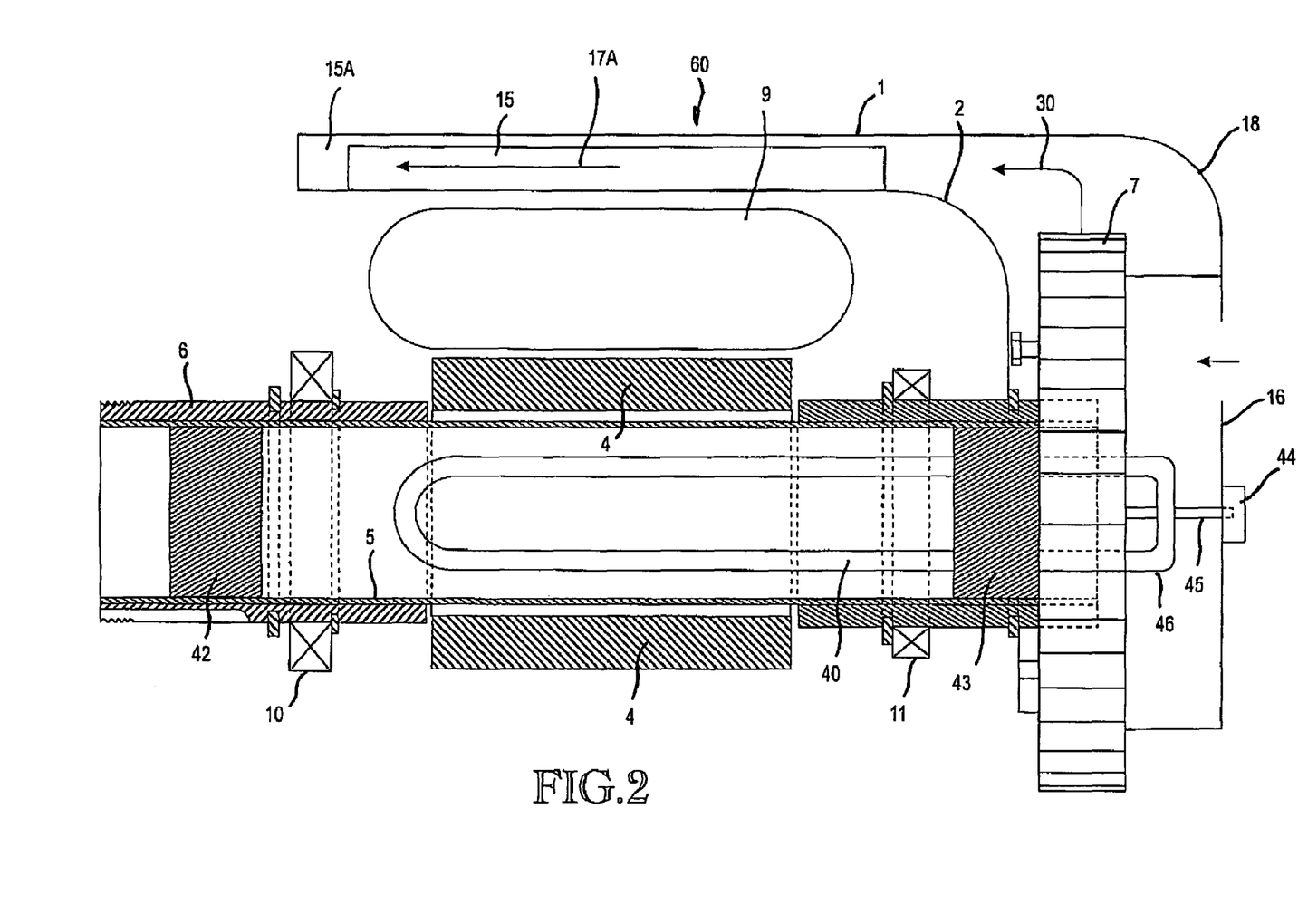
FIG. 2 is plan view, partially in section, partially in section, a permanent magnet generator that is cooled according to the disclosure herein.

FIG. 2 shows another preferred embodiment of a permanent magnet generator having a cooling system 60 according to the present invention. The generator has a generator housing 1 and a stator housing 2 that is fit within the generator housing. Stator windings 9 are located in the stator housing 2 and a rotor shaft 6 having a permanent magnet 4 attached to the outer surface thereof is rotatably mounted within the stator winding. The stator cooling fins 15 form part of the stator housing 2. The cooling fins 16 extend into an annular space 15A between the permanent magnet generator housing 1 and the stator housing 2.

A hollow permanent magnet rotor shaft 6 is rotatably supported within the permanent magnet generator stator. Some embodiments of the type of cooling system shown in FIG. 2 can include aluminum tube or sleeve 5 is fitted to the inside of the shaft to act as a heat sink in the same manner as the cooling system described above.

It is preferred that one or more radial, or journal bearings rotatably support the rotor, and in the embodiment depicted the rotor 6 and the permanent magnets disposed therein are rotatably supported by bearings 10 and 11. All bearings in the permanent magnet generator may be radial or journal bearings.

As the generator operates as described above, air flows into an inlet 30 that is located in the generator end cover 18 where the air becomes stator-cooling air 30. The cooling air 30 is drawn into the fan 7 and is forced into stator cooling channel where heat is exchanged from the stator winding 9 stator into cooling fins 15. The cooling air 30 in flow path 16 adsorbs the heat from the cooling fins, thereby cooling stator cooling fins 15 and stator housing 2 and then exits to the atmosphere.

The hollow rotor shaft 6 and permanent magnets 4 are cooled by a refrigeration system inserted into the hollow rotor and secured, one end being sealed by seal ring 42 and the other end by compressor 43. The refrigeration compressor rotor is connected to the front generator cover by quill shaft 44 attached to driving fixture 45.

Compressed refrigerant is circulated through a heat exchanger 40 where it adsorbs heat generated by the magnets. The heated gas is passed through a condenser 46 that rotates at generator speed, condenses the gas in the air stream and returns it to the refrigerant compressor 43, thereby causing a temperature reduction in the space between seal ring 42 and refrigeration compressor 43. Through this process, the hollow rotor shaft 6 and permanent magnets 4 are cooled thereby increasing the magnetic field strength of the rotor and improving the generator's efficiency.

Figure 3:
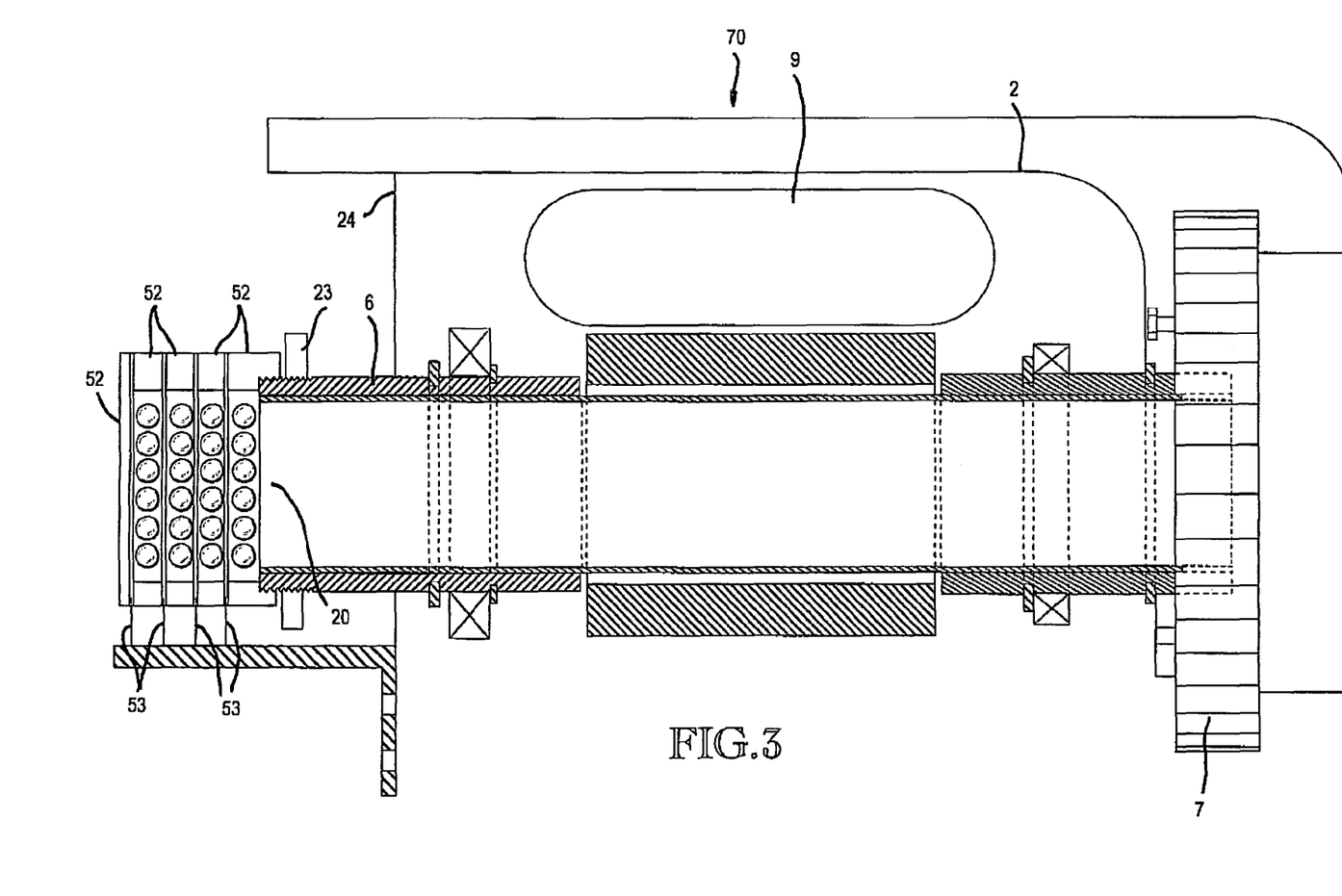
FIG. 3 is plan view, partially in section, detailing the air inlet for a permanent magnet generator according to the disclosure herein.
Figure 4:
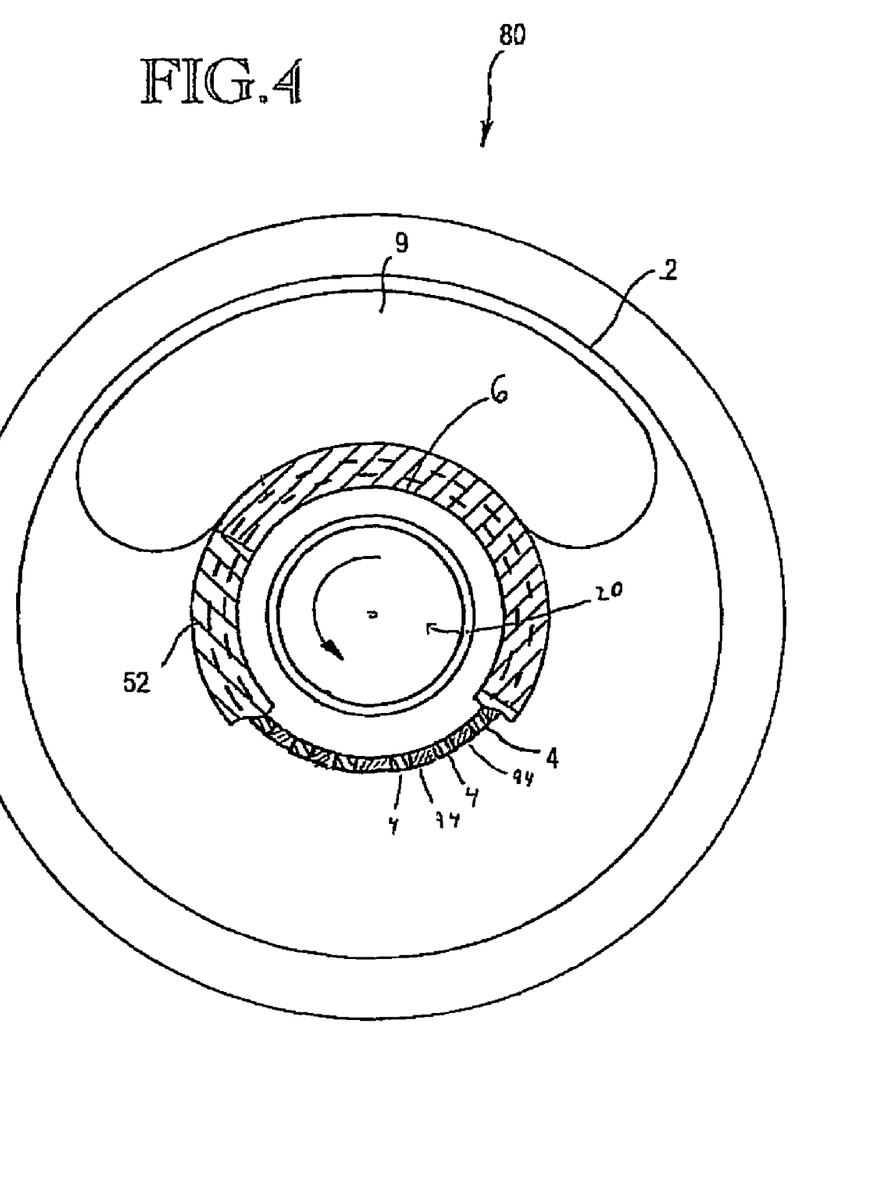
FIG. 4 is an end elevational view that illustrates the air inlet end of the permanent magnet generator.

FIGS. 3 and 4, show an embodiment of the current invention having an air filter assembly 52 that is attached to the primary cooling air inlet 20. Air flows through the air filter 52 and debris is automatically cleaned from the filter by fingers 53. The debris is removed from the area by gravity.

Air filter 52 is shown in FIG. 3 In this embodiment the air filter assembly 52 is shown with the cleaning fingers 53 that lay in cleaning grooves with the fingers pointing into the direction of rotation. The rotational speed of the air-filter assembly 52 causes debris to be removed from the filter assembly by centrifugal force. If debris clings to the exterior of air filter assembly 52, it will be scraped from the filter assembly by fingers 53 and fall free.

Again referring to FIG. 4, the interpole spacers 94 are indicated, as are permanent magnets 4. Permanent magnets 4 and interpole spacers 94 are attached to permanent magnet rotor 6 by a variety of methods including adhesives, epoxy reinforced fibers, metal clamps or rings constructed of alloys such as Nitinol alloys 50 or 60 or other suitable methods.

Nitinol 60 is a shape memory alloy that expands when cooled and contracts when heated. When Nitinol 60 is used, the permanent magnets are attached by rings of Nitinol 60 that have first been cooled so as to expand and then allowed to heat to the appropriate temperature such that the shrinkage of the material holds the magnets in place. Magnets attached by Nitinol 50 are attached mechanically.

Figure 5:
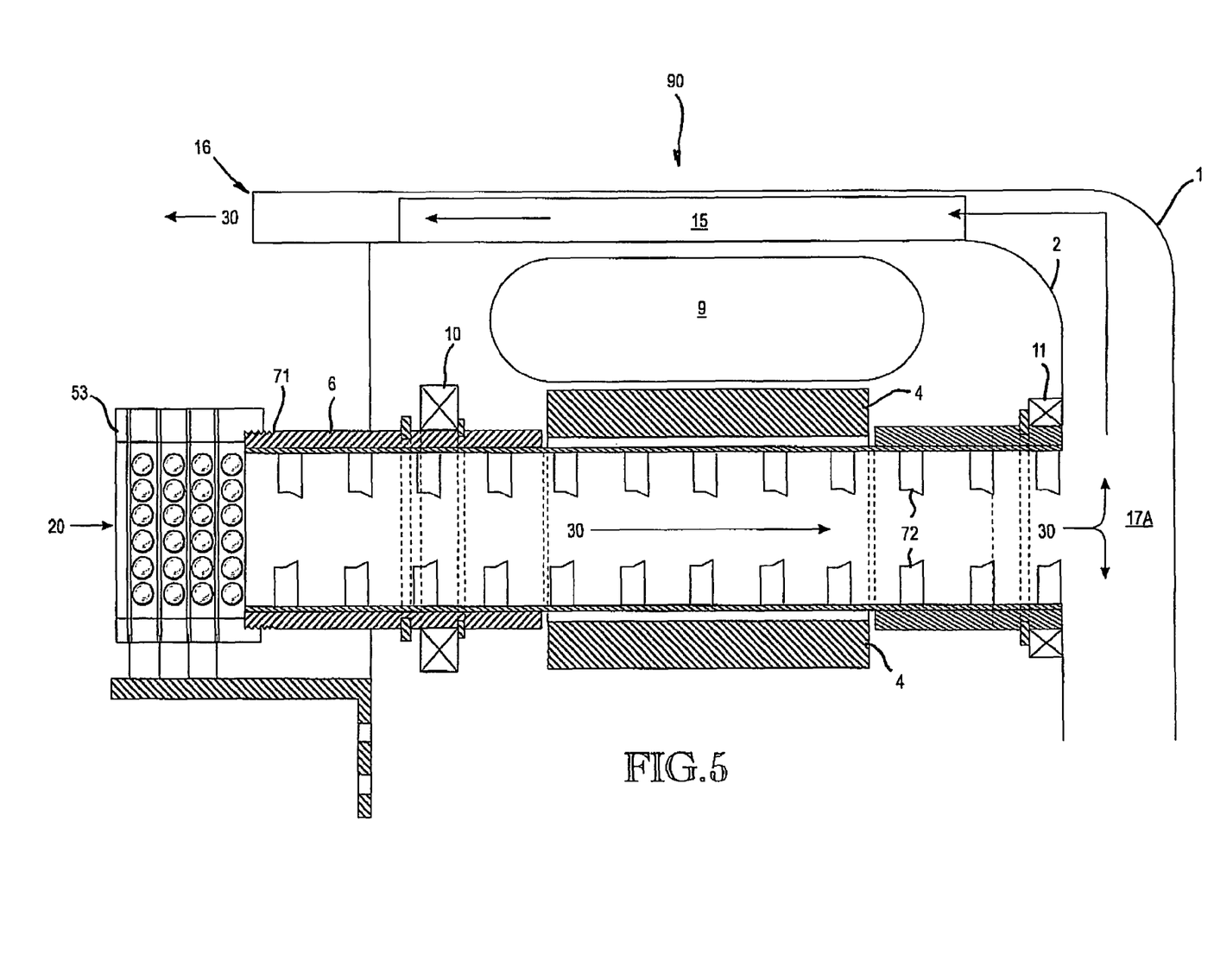
FIG. 5 is a plan view that illustrates an embodiment of the aluminum tube used as a heat sink according to the disclosure herein.

FIG. 5 illustrates the embodiment of the aluminum tube incorporating the axial flow fan. The axial flow fan has a plurality of vanes 72 and draws air through air filter assembly 52 into air inlet 20. The air 30 exits rotor shaft and is forced into stator cooling channel. Heat is exchanged from stator winding 9, into cooling fins 15, and then into the cooling air 30 in flow path 16, thereby cooling stator cooling fins 15 and stator housing 2 and exiting to the atmosphere.

Figure 6:
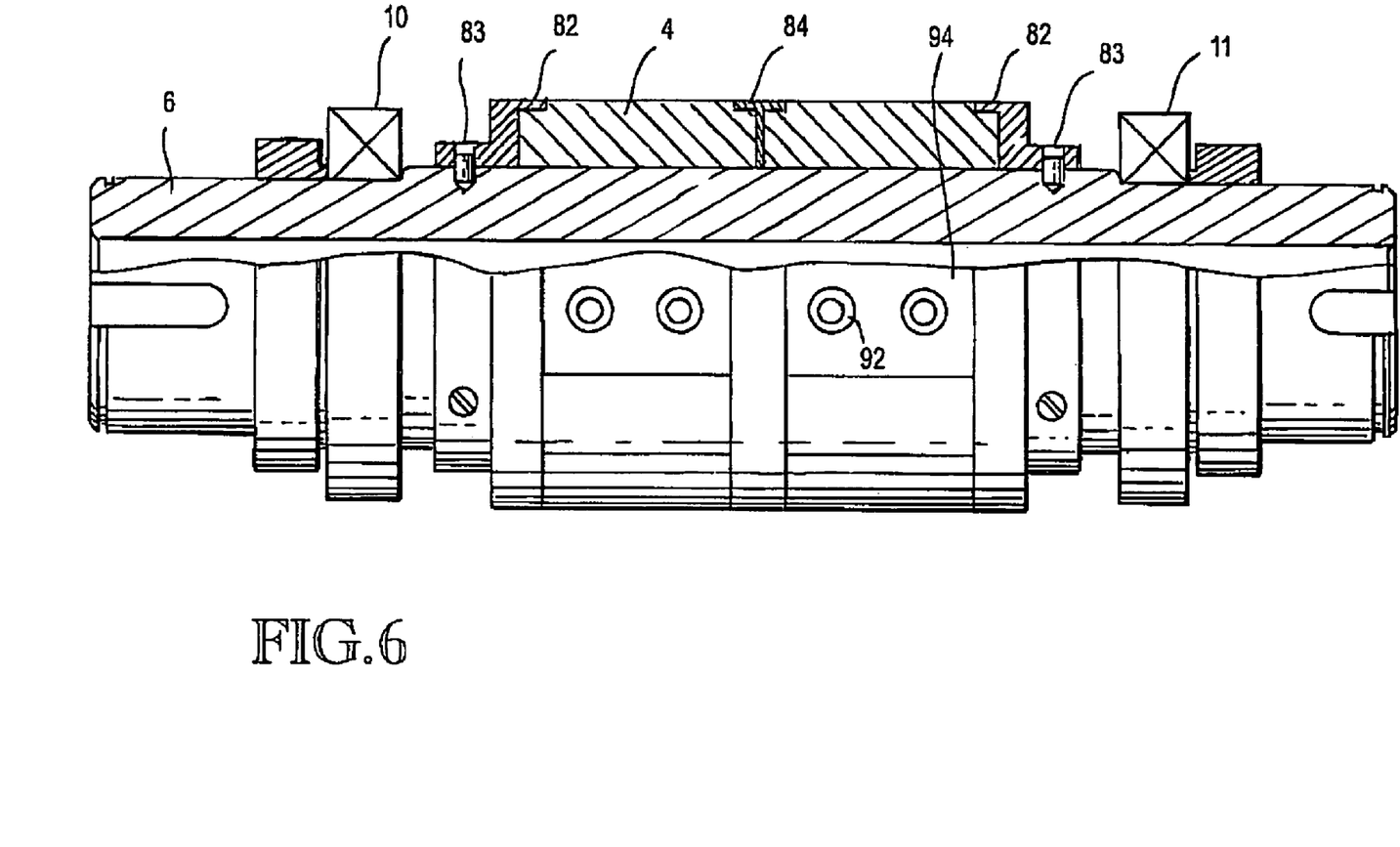
FIG. 6 is a side elevational view in partial section showing a illustrates a magnet retention ring used for securing magnets to a rotor shaft according to the current invention.

Referring to FIG. 6, there is shown another embodiment of a rotor shaft of the current invention wherein the magnets are secured to the rotor shaft by retention rings, which are in turn secured to the shaft. It is preferred that one or more radial, or journal bearings rotatably support the rotor, and in the embodiment depicted the rotor shaft 6 and the permanent magnets disposed therein are rotatably supported by bearings 10 and 11. All bearings in the permanent magnet generator 1 may be radial or journal bearings.

Attached to the rotor shaft 6 are permanent magnets 4 that are held on by a magnet retention rings 82. The retention rings 82 are fitted radially around the circumference of the shaft with close tolerances. The magnet retention rings 82, and the edges of the magnets are configured so that the rings overlap the edges of the magnets 4 by a distance sufficient to secure the magnets 4 to the shaft 6. In the embodiment depicted in FIG. 6, the edges of the magnets are stepped down or notched and the interior edges of the retention rings have an overlapping portion that is configured for placement in the notched area of the magnets.

The retention rings 82 are secured to the shaft 6 by threaded fasteners 83. The magnets 4 are further secured by a magnet spacer ring 84, which is fitted radially around the circumference of the shaft with very close tolerance. The magnet spacer ring 84 has a generally T-shaped cross section and it is configured for placement between the magnets 4 such that the top of the T-shaped cross section overlaps the top edges of the permanent magnets, thereby securing them in place.

Also seen in FIG. 6 are interpole pacer mounting holes 94. The interpoles are generally nonmagnetic poles between the magnetic poles of two adjacent magnets. They give radial stability to the magnets. The interpole spacers of the current invention are bimetal, half aluminum and half iron. These interpole spacers give improved sine wave generation to the generator during operation.

INDUSTRIAL APPLICABILITY

The invention has applicability in the field of generators. In particular, this invention describes cooling systems for permanent magnet generators. The cooling systems disclosed herein reduce or eliminate excessive heat in permanent magnet generators thereby reducing or eliminating the risk of damage or demagnetization of the generator. As a result of the cooling systems disclosed herein, power fluctuations are reduced thereby increasing the efficiency of the permanent magnet generator. The increased efficiency can result in more work performed in a given time or in less cost for a similar amount of work done by a generator without a cooling system as describe herein. Additionally, embodiments of the current invention allow air cooling wherein the air does not contact the electrical components of generators, thereby allowing the generators to perform in dusty, wet and explosive environments.

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used in permanent magnet generators, it will be readily apparent to those skilled in the art that the invention can be adapted to other uses generators as well. Therefore, the invention should not be construed as being solely limited to cooling systems for permanent magnet generators.

What is claimed is:

1. In a permanent magnet generator, the combination of:
   a generator housing;
   a sealed stator housing within said generator housing, said stator housing carrying stator windings and having an outer surface being fitted with external fins, said fins surrounded by a sleeve extending generally axially from front to rear along said stator housing external surface;
   a hollow shaft rotatably mounted within said stator housing, said shaft carrying permanent magnets which interact with said stator windings, said hollow shaft having an air channel communicating therethrough an inlet end and an outlet end whereby said permanent magnets are sealed from the outside environment;
   a fan mounted on said hollow shaft;
   a cylindrical aluminum sleeve mounted inside said hollow shaft;
   means for rotating said shaft;

whereby said stator housing is fit within said generator housing such that there is a space between said housings and when said generator is in operation, said fan draws cooling air forward through said cylindrical aluminum tube in said rotor shaft and ejects said air through said space between said stator housing and said generator housing over said stator housing external fins into the atmosphere; and thereby cools said generator, said stator and permanent magnets being sealed from the outside environment whereby the cooling air does not transverse and flow into the interior of the generator.

2. The generator of claim 1 further comprising an air filter.

3. The generator of claim 2, wherein said air filter is self-cleaning.

4. The generator of claim 1 wherein said magnets are held in place on said rotor shaft by a shaped metal alloy ring.

5. The generator of claim 4 wherein said shaped metal alloy ring is Nitinol 60.

6. The generator of claim 1 wherein said magnets are held in place by a plurality of magnet retention rings that are configured to secure said magnets to said shaft, said retention rings being fitted around said shaft and connected to said shaft.

7. The generator of claim 6 wherein said magnets include a plurality of permanent magnets arranged in a plurality of rows that extend around the circumference of said shaft and said magnets are further held in place by at least one magnet spacer ring that is configured to fit between two of said rows and secure said magnets to said shaft; and said spacer ring being filled around said shaft.

8. The generator of claim 6 wherein said magnets include a plurality of permanent magnets arranged in rows that extend around the circumference of said shaft, said magnets being placed such that the opposite poles of adjoining magnets face each other, the generator further comprising interpole spacers placed between adjoining magnets; and said interpole spacers being threadably connected to said shaft.

* * * * *